(12) United States Patent
Nene et al.

(10) Patent No.: US 12,731,213 B2
(45) Date of Patent: Sep. 8, 2026

(54) PHASED LOSS FUNCTION TRAINING FOR SUPER-RESOLUTION MODELS

(71) Applicant: MICROSOFT TECHNOLOGY LICENSING, LLC, Redmond, WA (US)

(72) Inventors: Sameer Avinash Nene, Redmond, WA (US); Matthew Lawrence Bronder, Bellevue, WA (US); Michael George Boulton, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 439 days.

(21) Appl. No.: 18/325,727

(22) Filed: May 30, 2023

(65) Prior Publication Data

US 2024/0404006 A1 Dec. 5, 2024

(51) Int. Cl.
*G06T 3/4053* (2024.01)

(52) U.S. Cl.
CPC .................................. *G06T 3/4053* (2013.01)

(58) Field of Classification Search
USPC .......................................................... 382/100
See application file for complete search history.

(56) References Cited

FOREIGN PATENT DOCUMENTS

CN 112598579 A 4/2021
WO WO-2023014935 A1 * 2/2023 .......... G06T 3/4053

OTHER PUBLICATIONS

Choi, et al., "Deep learning-based image super-resolution considering quantitative and perceptual quality", Neurocomputing, vol. 398, Jul. 20, 2020, pp. 347-359.
International Search Report and Written Opinion received for PCT Application No. PCT/US2024/026911, Jul. 19, 2024, 13 pages.
International Preliminary Report on Patentability (Chapter I) received for PCT Application No. PCT/US2024/026911, mailed on Dec. 11, 2025, 7 pages.

* cited by examiner

*Primary Examiner* — Jacky X Zheng
(74) *Attorney, Agent, or Firm* — Workman Nydegger

(57) ABSTRACT

Phased loss function training of machine learning models that are configured for performing super-resolution image processing includes training with two or more discrete phases that each apply different combinations of loss function training to the super-resolution models. In a first phase, for example, a first loss function is applied to the model that is a per-pixel or a non-perceptual loss function. In a second phase, which begins after the model reaches a threshold of convergence in the first phase, a blended loss function is applied, which includes the application of at least one perceptual loss function. Then, after the model reaches a subsequent threshold of convergence in the second phase, which is greater than the threshold of convergence in the first phase, the model is optionally further modified with optimizations such as quantization and/or sparsity optimizations for further facilitating subsequent super-resolution processing.

16 Claims, 5 Drawing Sheets

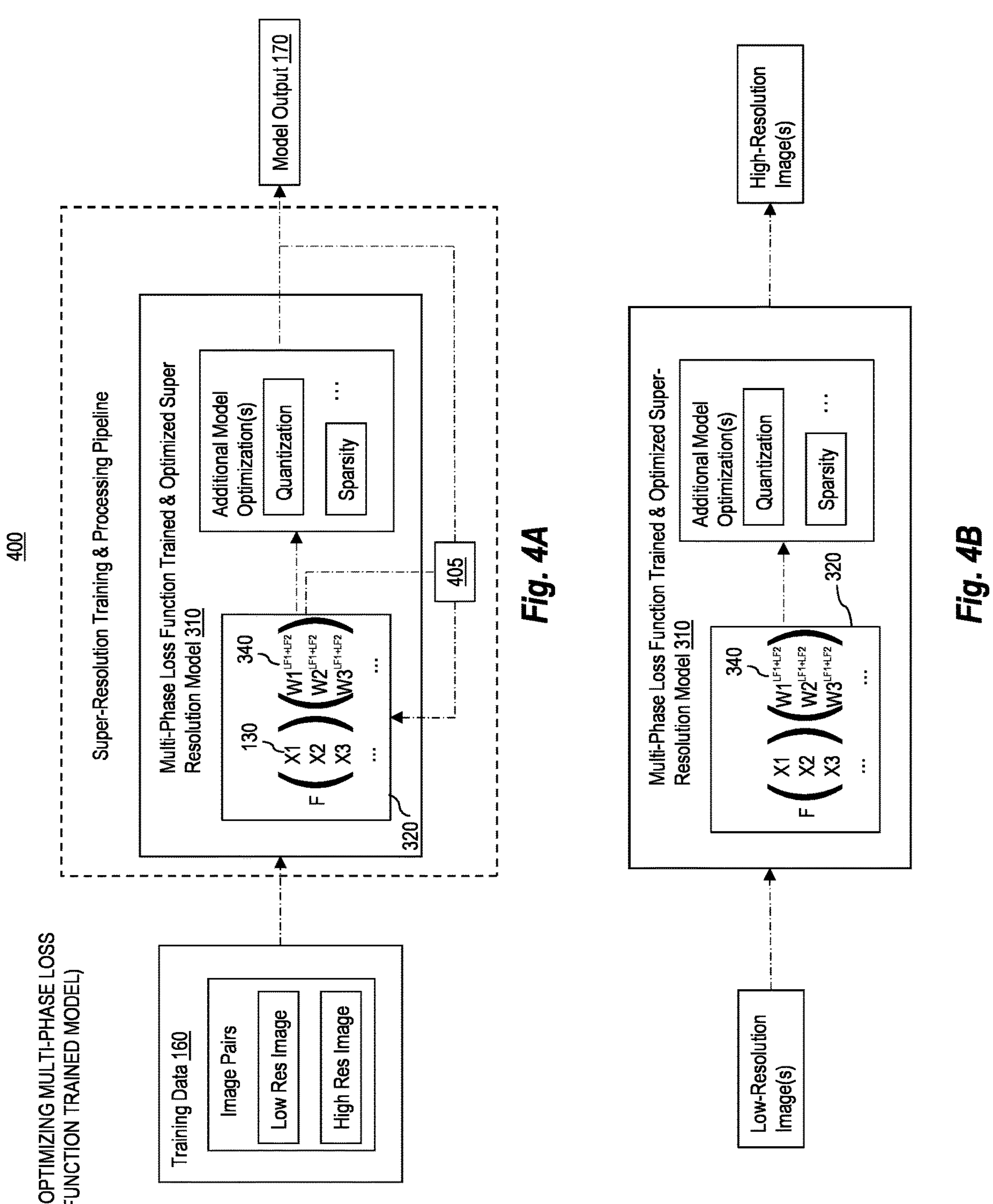
400
(OPTIMIZING MULTI-PHASE LOSS FUNCTION TRAINED MODEL)
Training Data 160
Image Pairs
Low Res Image
High Res Image
Super-Resolution Training & Processing Pipeline
Multi-Phase Loss Function Trained & Optimized Super Resolution Model 310
320
130
340
F
X1
X2
X3
...
W1
W2
W3
LF1+LF2
Additional Model Optimization(s)
Quantization
Sparsity
...
405
Model Output 170
Fig. 4A
Low-Resolution Image(s)
Multi-Phase Loss Function Trained & Optimized Super-Resolution Model 310
320
340
Additional Model Optimization(s)
Quantization
Sparsity
High-Resolution Image(s)
Fig. 4B

PHASED LOSS FUNCTION TRAINING FOR SUPER-RESOLUTION MODELS

BACKGROUND

The process of performing super-resolution on an image includes upscaling or otherwise generating a higher resolution image of a base image by rendering the base image with a larger quantity of pixels than the base image contains. For example, a base image having a 1080p resolution (1920×1080 pixel resolution) can be upscaled to a 4K resolution image (3840×2160 pixel resolution) by converting each of the pixels in the 1080p resolution into four new upscaled pixels.

Super-resolution processes include the use of algorithms that are configured to generate outputs comprising new details for newly upscaled pixels which are not present in the underlying pixels and such that the new upscaled pixels are not mere duplicates of the underlying base pixels from which they depend. For example, each of the new pixels in an upscaled image will contain a set of properties that are based on some combination of the properties of the underlying base pixel, as well as properties of the neighboring pixels that are contained within the base image and, in some instances, based at least in part on the properties of neighboring pixels in the upscaled image. These complex super-resolution processes effectively smooth out the edges of the new pixels while also enabling the final upscaled images to appear more detailed than the underlying images from which they are based.

Many different types of super-resolution algorithms and techniques can be used to upscale an image. Each of these algorithms can be tuned for different desired outcomes and styles by controlling algorithm weights that are applied to the imaging control variables used by the algorithms to generate and render the new image data.

Recent developments in computer technologies include the creation of machine learning models that can be trained to perform a desired set of tasks, including upscaling and other forms of super-resolution image processing. Super-resolution machine learning models, for example, can be configured with one or more super-resolution processing algorithms that are trained or otherwise tuned to perform super-resolution processing on a particular type or class of lower resolution images and in such a manner as to consistently generate a desired output of upscaled images in a preferred style and higher resolution.

Unfortunately, the training of machine learning models involves incredibly time-intensive and computationally expensive processes. Accordingly, any improvements in the manner in which machine learning models can be trained, particularly improvements that can reduce the overall training time and/or computational costs of the training, are desired.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments include phased loss function training for machine learning models that are configured for performing super-resolution image processing. The phased loss function training includes two or more discrete phases that each apply different combinations of loss functions to the machine learning models while the super-resolution models proceed along their gradient descents to desired thresholds of convergence for the least local minimums or global minimums associated with the training that is being applied.

In the first phase, for example, a first loss function is applied that is a per-pixel or a non-perceptual loss function. In the second phase, which begins after a desired threshold of convergence is reached in the first phase, a blended loss function is applied, which includes the application of at least one perceptual loss function.

Then, after a subsequent threshold of convergence is reached in the second phase of training, which is greater than the first threshold of convergence reached during the first phase of training, the models are optionally further modified with additional optimizations such as quantization and/or sparsity optimizations for further facilitating efficiencies for performing subsequent super-resolution processing with the trained and modified super-resolution models.

As described herein, the phased loss function training, in some instances, can help reduce an overall training time and/or computational cost associated with the training of the models, particularly as compared to training processes that do not apply different combinations of loss functions to different phases of the training.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 4A illustrates an example processing flow associated with a multi-phase loss function training and optimization of a machine learning model configured for performing super-resolution and in the machine learning model is modified to perform imaging optimizations subsequent to applying a first loss function during a first phase of the training and a second loss function during a second phase of the training.

FIG. 4B illustrates an example processing flow of a multi-phase loss function trained and optimized super-resolution model performing super-resolution processing of a low-resolution image and outputting a high-resolution image corresponding to the low-resolution image.

DETAILED DESCRIPTION

Figure 1:
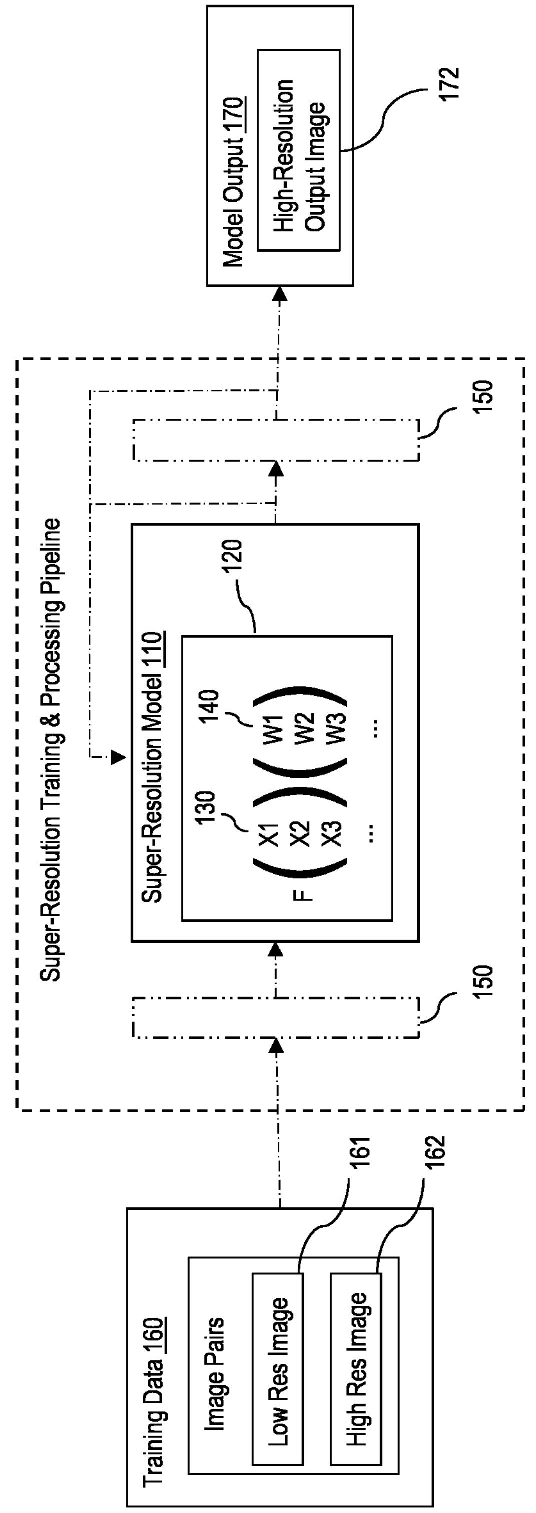
FIG. 1 illustrates an example processing flow associated with the training of a machine learning model configured for performing super-resolution.

As noted above, the disclosed embodiments include methods and systems for performing phased loss function training of super-resolution machine learning models. The phased loss function training includes two or more discrete phases of training that each apply different combinations of loss functions to the super-resolution models. In the first phase, for example, a first loss function is applied to the model that is a per-pixel or a non-perceptual loss function. In the second phase, which begins after the model reaches a threshold of convergence in the first phase, a blended loss function is applied, which includes the application of at least one perceptual loss function that was not used in the first phase of training. Then, after the model reaches a subsequent threshold of convergence in the second phase, the model is optionally further modified with optimizations such as quantization and/or sparsity optimizations for further facilitating subsequent super-resolution processing.

In some instances, the use of discrete and separate training phases applied to the machine learning modes can significantly reduce the overall time and cost associated with training the model by at least 5%, 10%, or even more than 10%. In this regard, it is noted that the training being performed to a super-resolution model is a relative term corresponding to the type of training being performed and desired results from the training. In many instances, the training includes modifying a selection of parameters to be used in the algorithms of the model (e.g., pixel intensity, pixel color, the influence of neighboring pixels, etc.) and weights for those parameters that are used as the model proceeds along a gradient descent to a desired threshold of convergence defined by loss functions that quantify errors associated with the output generated by the model when compared to a desired/target output.

It is also noted that the referenced phased loss function training is often described herein as being applied to super-resolution machine learning models that are configured to perform super-resolution of an image by upscaling, to perform anti-aliasing, or to otherwise enhance the resolution or display properties of the image. That said, the phased loss function training techniques that are described herein can also be applied to other types of image processing machine learning models to reduce the training time required to train those models for performing their corresponding types of imaging processes or transformations, such as, for example, changing a size, changing an orientation, cropping, stylizing, coloring, filtering, applying depths or textures, masking, or other image processing. These processes may also be applied, as sub-processes of the super-resolution processing described herein.

The multi-phase training described herein includes two or more discrete training phases that each apply different loss functions (of the same type or different type) and/or different combinations of different loss functions to super-resolution machine learning models. For example, in some instances, a first training phase may include the use of a first type of loss function (e.g., a per-pixel or a non-perceptual loss function, such as the L1 loss function, the L2 loss function, or a structural similarity (SSIM) loss function). In a second training phase, which begins after the model reaches a threshold of convergence in the first training phase, a second type of loss function can be used (e.g., a perceptual loss function, such as the Visual Geometry Group (VGG) 19 loss function or another perceptual loss function, such as another VGG loss function or a convolutional neural network loss function).

In some embodiments, a common loss function is used in each of the two or more different training phases, but in different proportional ways and/or in combination with different loss functions. The manner in which different loss functions are used in different combinations within the different training phases will become more apparent in the descriptions and examples that follow below in reference to FIGS. 2A-4.

After training the model in the two or more phases, the model can be further modified with optimizations such as quantization and/or sparsity optimizations. Such optimizations can help reduce the overall computational costs associated with performing image processing (e.g., the super-resolution processing) with the trained models, as described in more details below with reference to FIG. 4.

The high costs and time associated with training machine learning models are well-known. Sometimes, the training can be sped up by obtaining higher-quality training data. In other instances, the model training can be improved by selecting loss functions that better quantify the errors most relevant to a particular type of processing being performed or a desired result.

Unfortunately, in the realm of image processing, there does not appear to be a single loss function that is considered universally the best, particularly when considering the diverse set of image processing machine learning models that exist. This is also true when considering the significant variety of configurations and applications for super-resolution machine learning models. In particular, some models benefit more from non-perceptual loss functions (e.g., font processing models) while others benefit more from perceptual loss functions (e.g., stylistic imaging processing models).

A loss function can be applied to the training of a super-resolution model to tune the model for a particular imaging characteristic (e.g., adding seed spots to a previously smooth textured strawberry and adding other expected textures to objects in the image). However, overtraining a super-resolution model with a single perceptual loss function can also result in overly creative modifications that may be undesirable in some instances (e.g., changing a character 'e' into a differently shaped object that cannot easily be discerned as an 'e.').

Some conventional techniques for training machine learning models include the application of multiple loss functions concurrently to the model that is being trained in a single training cycle to help address some of the extreme side effects that can result from using only a single loss function. Unfortunately, by applying multiple loss functions to the training of the model in a single training cycle, the training can take longer (e.g., longer to reach the least local or global minimum) and be more computationally expensive than it would by using only a single loss function.

The disclosed techniques can help overcome many of the foregoing problems by staging the training of the super-resolution models with two or more separate phases, wherein each phase is associated with a unique set of one or more loss functions, rather than applying all of the loss functions together in only a single continuous phase or cycle of training.

Advantageously, training super-resolution models with multiple phases in which a first phase includes the use of a non-perceptual loss function followed by a second phase that includes the use of a perceptual loss function has been found to significantly improve efficiencies associated with training the models and for obtaining the least local/global minimums of the super-resolution models in a more time and cost-effective manner than when applying the perceptual loss function(s) first or when applying all of the loss functions during a single training cycle applied all the way (in the same proportional way) throughout the training.

The disclosed multiphase training includes training the model with a non-perceptual loss function until a first threshold of convergence is reached and then training the model with a perceptual loss function until a subsequent threshold of convergence is reached. Sometimes, a non-perceptual loss function is also used in the subsequent training phase(s), such as in a blended loss function application, but in a reduced proportional way as compared to how the non-perceptual loss function was used in an earlier training phase.

Attention is now directed to FIG. 1. In this illustration, a computing environment 100 is shown that includes a super-resolution model 110 undergoing training in a super-resolution training and processing pipeline. The super-resolution model 110 includes one or more imaging transformation algorithms 120 that compute output values for the pixels to be rendered in a high-resolution image based on various input variables 130 (e.g., parameters) extracted from the low-resolution images included in training data 160 and weights 140 applied to those parameters.

Examples of super-resolution machine learning models that may be used include the Laplacian Pyramid Super-Resolution network (LapSRN), Fast Super-Resolution Convolutional Neural Network (FSRCNN), and Efficient Sup-Pixel Convolutional Neural Network (ESPCN).

The processing pipeline may also include additional or optional processes 150 in the pipeline that are independent of the super-resolution model 110. For example, additional computations and transformations that can be applied to the imaging data include specialized filtering or masking functions that are not variably dependent on the input variables and weights of the model algorithms 120. In this regard, they can be considered separately from the super-resolution model 110 and will not, therefore, be shown or discussed any further with regard to the training of the model and model algorithms.

Attention will now focus on the specific training of the super-resolution model 110, and even more specifically, the multi-phase training that is applied to the super-resolution model 110.

During training, the model (e.g., the super-resolution model 110) receives training data 160 that includes pairs of corresponding images (e.g., low-resolution image 161 and high-resolution image 162 which depict the same content, i.e., the high-resolution image is a high-resolution version of the low-resolution image). When the model applies the imaging algorithms 120 to the low-resolution images, weights are applied by the algorithms 120 to the different image inputs and variables 130 that are extracted from or that are otherwise associated with the low-resolution images. The resulting model output 170 comprises newly generated high-resolution images based on the low-resolution images provided in the training data. A desired result from the training is for the attributes of the generated high-resolution images (e.g., high-resolution output image 172) to match (i) the attributes of the high-resolution input images received as input with the training data (e.g., high-resolution image 162) and/or (ii) specified target attributes associated with a target high-resolution image having a particular style and resolution based on the low-resolution image.

Detected differences between (a) the high-resolution images that are output by the model and (b) the desired target high-resolution input images can be characterized as errors that the model needs to be trained to reduce or eliminate.

These errors or differences between the desired target images and the actual output images are iteratively fed back into the model as backpropagation data that is processed by the model to tune or adjust the weights 140 of the model for subsequent processing iterations. As training proceeds in this manner, the model will produce fewer and fewer errors and eventually converge at a desired proficiency for converting low-resolution input images into high-resolution output images having a desired resolution and style.

A gradient descent process may be used during training to update the weights of the model. As will be appreciated by those of skill in the art, the gradient descent process is a process in which a model resolves or converges at a least local minimum or the global minimum in which the weights to the parameters of the model have been tuned to optimal values for enabling the model to generate the desired outputs. At the convergence of the gradient descent, further changes to the parameter weights would make a nominal difference to the model.

To help track the training progress, and in an effort to expedite the convergence of the model to the least local or global minimum for the various algorithm parameters selected and/or weights applied to the parameters, the model is paired with a loss function that is specifically designed to quantify the differences that are detectable between the generated outputs and the target images. In general, a loss function indicates how well an algorithm models a data set and can help quantify different types of errors in the algorithms that are being used by the model.

Some loss functions can help identify objective differences between the pixel attributes, on a pixel-by-pixel comparison, between the pixels of the target high-resolution images and the pixels in the upscaled images created from the model. These types of loss functions are typically referred to as non-perceptual loss functions or per-pixel loss functions. Examples of non-perceptual loss functions include the L1 loss function which measures absolute loss or the difference between a prediction and actual value for each pixel, the L2 loss function which measures squared differences between predictions and actual values for the image pixels, and the Structural Similarity Index (SSIM) loss function.

Loss functions that focus more on perceptual aspects of an image, such as content and stylistic discrepancies between images are typically referred to as perceptual loss functions. Perceptual loss functions generally work by summing all the squared errors between all the pixels and taking the mean. This is in contrast to per-pixel loss functions which generally sum all the absolute errors between pixels.

Perceptual loss functions are particularly beneficial when considering image comparisons in which pixels have been shifted by one or more pixels and such that a per-pixel comparison will not give desired results. Examples of perceptual loss functions include Visual Geometry Group (VGG) loss functions (e.g., VGG19), Learned Perceptual Image Patch Similarity (LPIPS) loss functions, and Generative Adversarial Network (GAN) loss functions.

As described herein, the threshold of convergence that is reached for triggering the completion of a training phase occurs as the weights 140 applied by the algorithms 120 to the algorithm parameters are modified to optimal values for causing the loss function value to approach zero or another predefined nominal value (corresponding to the least local minima for the different parameters), and signifying that the model has been sufficiently trained to generate output that matches target outputs with a minimal difference or error between the generated output and the target output.

The threshold of convergence can be represented as a numerical value that quantifies the error(s) associated with the model performance relative to the target performance (e.g., a value of 0.001, 0.0005, 0.0001, 0.00005, 0.00001, or another value). The threshold of convergence can alternatively be represented as a percentage of relative change in the loss function error values generated by the model over time or per training iteration (where each iteration includes the processing of a predetermined quantity or batch of one or more training data inputs into corresponding outputs), such that the relative change has reached a predefined minimal value (e.g., 0.001% change, 0.0001% change, or even a smaller change). The threshold of convergence can also be defined as a slope of gradient descent that the model is experiencing during the training, as the model approaches the least local or global minimum values, such as defined by the loss functions (e.g., a slope of 0.001 or 0.0001 or a slope that approaches zero even more).

A predefined threshold of convergence can be established for each phase of the multi-phase loss function training. Ideally, the threshold of convergence established for each subsequent phase of training will be smaller than a predefined threshold of convergence of a preceding phase.

Figures 2A, 2B:
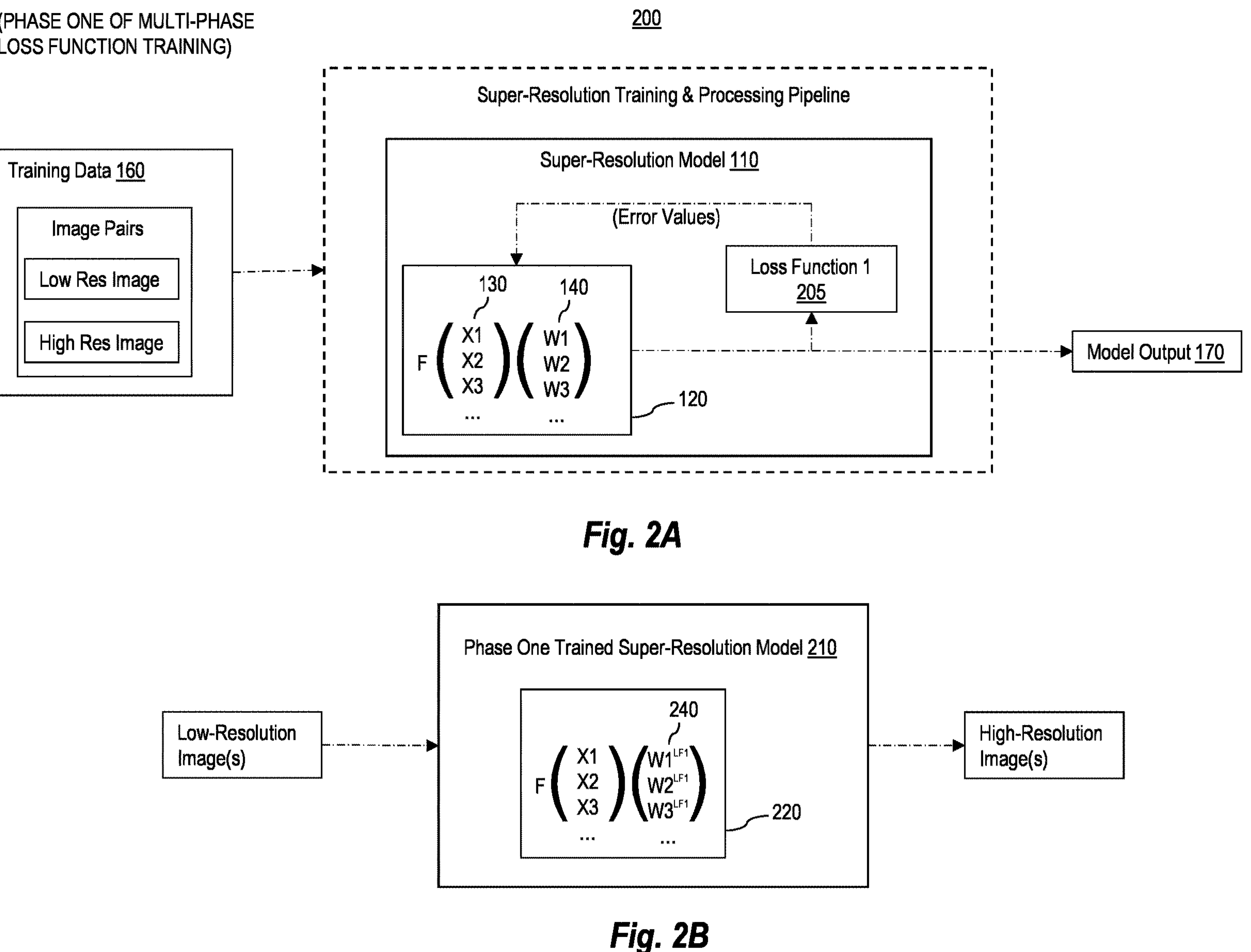
FIG. 2A illustrates an example processing flow associated with a multi-phase loss function training of a machine learning model configured for performing super-resolution and in which a first loss function is applied during a first phase of the training.
FIG. 2B illustrates an example processing flow of a phase one trained super-resolution model performing super-resolution processing of a low-resolution image and outputting a high-resolution image corresponding to the low-resolution image.

FIG. 2A illustrates a visualization 200 of a first phase of a multi-phase loss function training of a super-resolution model 110. As shown, this first phase includes the super-resolution model 110 applying the algorithms 120 of the model with the corresponding input variables 130 and weights 140 applied to the training data 160 inputs to generate corresponding model output 170.

Error values generated by a first loss function 205 (i.e., loss function 1) quantify the variance between the generated model output and the corresponding target output, as described earlier. The error values output from the first loss function 205 are used by the super-resolution model 110 to modify one or more of the weights 140 applied to the input variables 130 by the model algorithms 120. These error values will ideally follow a gradient descent towards a predetermined threshold of convergence during the training and during which the weights of the algorithm will be continually updated. Once this threshold of convergence is reached, the model has become a phase one trained super-resolution model 210, and training of the phase one trained super-resolution model 210 will advance to a second phase, such as will be described in FIG. 3A.

FIG. 2B illustrates a configuration of the phase one trained super-resolution model 210 configured with super-resolution algorithms 220 having updated weights 240 as compared to the weights 140 used before model 110 undergoes the phase loss function training (e.g., as depicted in FIG. 2A). For example, W1 has become $W1^{LF1}$, W2 has become $W2^{LF1}$, and W3 has become $W3^{LF1}$, etc. In this configuration, the model is prepared to process low-resolution images and to generate corresponding high-resolution images with better results than was possible with model 110 prior to the training and updating of the weights.

With regard to the processes performed in the first phase of training (FIG. 2A), it is noted that the error values are generated by the first loss function 205 for each output generated. In alternative embodiments, the error values are averages based on a predetermined batch or plurality of outputs generated by the model 110.

In some embodiments, the first loss function 205 is a per-pixel loss function, such as an SSIM loss function, an L1 loss function, an L2 loss function, another non-perceptual loss function, or a blend of non-perceptual loss functions.

In some alternative embodiments, the loss function 205 is a set of blended loss functions comprising one or more non-perceptual loss function(s) and one or more perceptual loss function(s), where a greater weight or proportion of the error values being generated by the loss functions are based on the non-perceptual loss function(s) than on any combination of the perceptual loss function(s) in the blended set of loss functions (e.g., >50% of the error value is based on the non-perceptual loss function(s), and <50% of the error value is based on any perceptual loss function(s) in the blended set of loss functions).

The percentage of proportional use or consideration of the different loss functions may remain static during the training phase. Alternatively, the percentages and proportional use or consideration of the different loss functions may be dynamically adjusted during a single training phase. For example, during training, as the model begins converging along the gradient descent, reaching certain predetermined thresholds of convergence, the model can dynamically adjust which loss function is used and/or the weights and considerations of the loss functions being used.

Figures 3A, 3B:
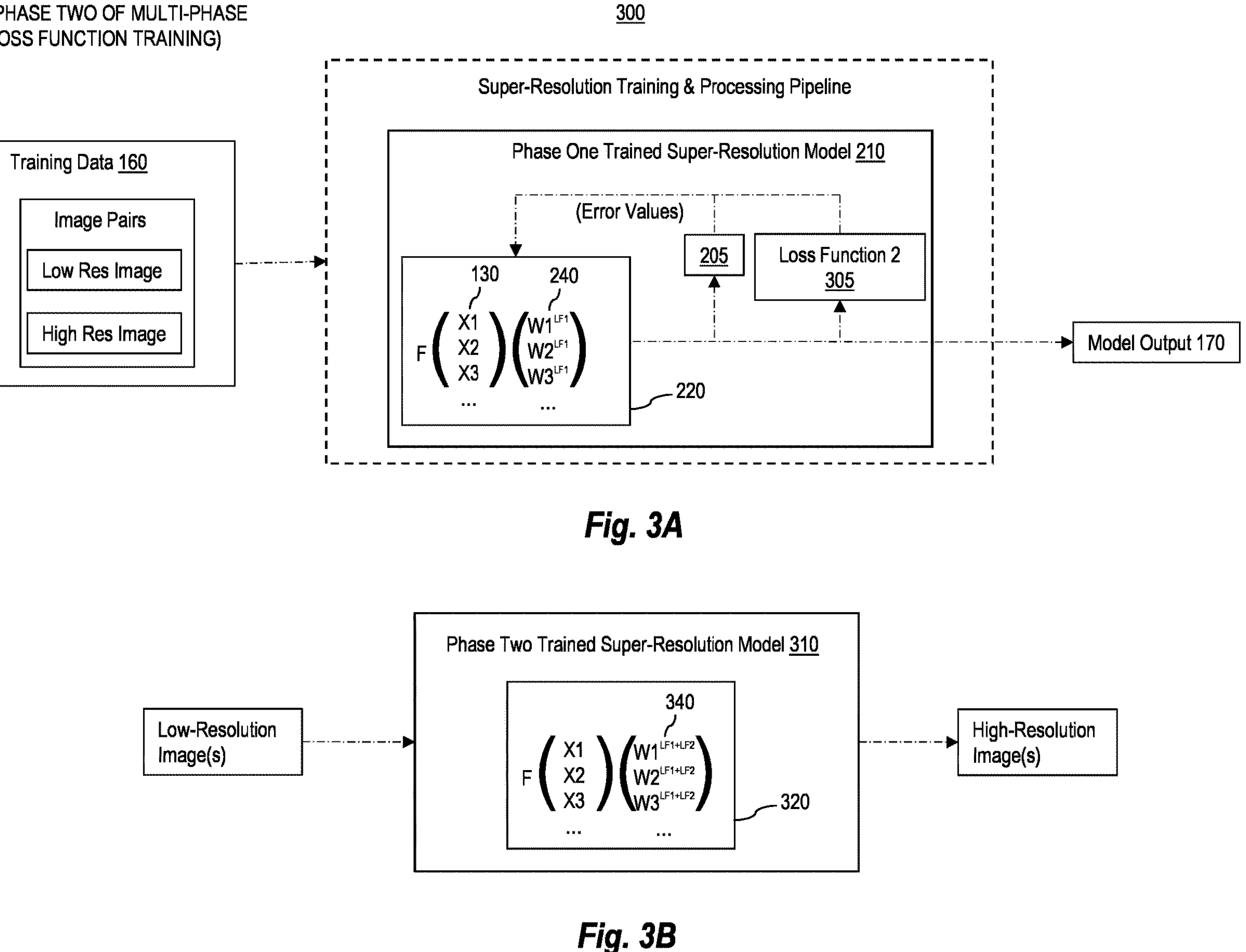
FIG. 3A illustrates an example processing flow associated with a multi-phase loss function training of a machine learning model configured for performing super-resolution in which a second loss function is applied during a second phase of the training that is different from a first loss function that is applied during a first phase of the training.
FIG. 3B illustrates an example processing flow of a phase two trained super-resolution model performing super-resolution processing of a low-resolution image and outputting a high-resolution image corresponding to the low-resolution image.

Attention is now directed to FIG. 3A, which illustrates a visualization 300 of a second phase of a multi-phase loss function training of a super-resolution model (e.g., continued training of super-resolution model 110 from FIG. 2A, which is now represented as the phase one trained super-resolution model 210 from FIG. 2B).

As shown, this second phase includes the phase one trained super-resolution model 210 applying the updated algorithms 220 of the model with the correspondingly updated weights 240 that are applied to the variables 130 of the training data 160 inputs to generate corresponding model output 170.

During this second phase, error values are generated by a second loss function 305 (i.e., loss function 2) that quantify the variance between the generated model output and the corresponding target output, as described earlier.

The error values output from the second loss function 305 are used by the phase one trained super-resolution model 210 to modify one or more of the weights 240 applied by the updated model algorithms 220. As before, these error values will ideally follow a gradient descent towards a second predetermined threshold of convergence that is different than and preferably smaller than the first predetermined threshold of convergence and during which the weights 240 of the algorithm will be continually updated.

Once this second threshold of convergence is reached, the training of the model will advance to a subsequent training phase that utilizes different combinations of loss functions and/or a final phase for optimizing the model as described in FIGS. 4A-4B.

FIG. 3B illustrates a configuration of a phase two trained super-resolution model 310 configured with super-resolution algorithms 320 having updated weights 340 as compared to the updated weights 240 that resulted from the first phase of training. For example, $W1^{LF1}$ has become $W1^{LF1+LF2}$, $W2^{LF1}$ has become $W2^{LF1+LF2}$, and $W3^{LF1}$ has become $W3^{LF1+LF2}$, etc. In this configuration, the model is prepared to process low-resolution images and to generate corresponding high-resolution images with better results than was possible with model 110 and/or with the phase one trained super-resolution model 210.

With regard to the processes performed in the second phase of training (FIG. 3A), it is noted that the error values are generated by the second loss function 305 for each output generated. In alternative embodiments, the error values are averages based on a predetermined batch or plurality of outputs generated by the model.

In some embodiments, the second loss function 305 is a perceptual loss function such as a Visual Geometry Group (VVG) loss function, like VGG19 or another VGG loss function, or a blend of different perceptual loss functions.

In some alternative embodiments, the second loss function 305 is a set of blended loss functions comprising one or more non-perceptual loss function(s) and one or more perceptual loss function(s), but wherein a greater weight or proportion of the error values used by the loss functions are based on the perceptual loss function(s) than on any combination of the non-perceptual loss function(s) in the blended set of loss functions. (e.g., >50% of the error value is based on the perceptual loss function(s), and <50% of the error value is based on any non-perceptual loss function(s) in the blended set of loss functions).

The percentage of proportional use or consideration of the different loss functions may remain static during the training phase. Alternatively, the percentages and proportional use or consideration of the different loss functions may be dynamically adjusted during a single training phase. For instance, a user may provide instructions or select controls on a model training interface for causing the model to apply different loss functions during training to affect the overall result of the images that are upscaled with the trained model. This is beneficial for providing user control over the application of the different loss functions to obtain a desired result (e.g., more creative results, such as adding seeds to an untextured strawberry, or less creative results to avoid misrepresentations of text characters).

In some embodiments, when a video depicts a lot of motion, a pixel-based loss function is weighted more heavily. Alternatively, in embodiments where a video is depicting static scenes, a perceptual loss function will take on more weight.

In some embodiments, the system uses a blended loss function comprising a combination of the SSIM loss function (presently illustrated as loss function 205) and the VGG19 loss function (presently illustrated as loss function 305). Additionally, in some embodiments, the percentage or proportional consideration of the SSIM loss function is reduced and the percentage or proportional consideration of the VGG19 loss function is increased dynamically during the training phase.

Attention is now directed to FIG. 4A, which illustrates a visualization 400 of multi-phase loss function trained and optimized super-resolution model 310 being further trained with training data in which the model continues to generate output based on the training data. In this example, the model continues to modify the parameters and weights of the model algorithm, when appropriate, based on quantified errors specified by any loss function(s) 405 used to perform the final tuning of the model.

The loss function(s) 405 used at this stage may be unique combinations of loss functions that have not previously been used together in earlier training stages and/or they may be the same loss functions previously used but in a different proportional way than previously used in any of the preceding stages of training.

The training of the super-resolution models is much more efficient when utilizing multi-phase loss function training than when utilizing single-phase loss function training. Additionally, performing the multi-phase loss function training prior to modifying the model with optimizations, such as sparsity and/or quantization optimizations, brings benefits which include reduced training time and improved quality of images generated by the trained model. Accordingly, the model modifications using sparsity or quantization occur only after the model first achieves the desired level of training and convergence(s) using the phased loss-function training described above, by refraining from modifying the super-resolution model with the sparsity and/or quantization optimizations until it is first determined that the referenced first and second training phases have been completed.

Then, once it is determined that the model is sufficiently trained, the model can be modified with one or more optimizations, as shown. These optimizations may modify the final outputs from the model to improve the efficient processing of the image data for different runtime use scenarios such as execution on computing devices with different amounts of processing capability. They may also modify the structure and/or processing of the model algorithms without significantly impacting accuracy.

By way of example, as shown in FIG. 4B, the model (i.e., the multi-phase loss function trained and optimized super-resolution model 310) receives low-resolution images as input and generates corresponding model output as high-resolution image(s). However, the additional modifications cause the model to generate and produce high-resolution image data faster than could be provided without the optimizations. In particular, the sparsity optimization causes the model to omit processing of any data items that are determined to be negligible due to the weights of a corresponding data item being driven to zero value. By omitting processing of such data items from the model, through the numerous convolutional layers in the model architecture, the model can process the data more quickly.

While the sparsity optimization is shown as a separate component of the model for this illustration, the sparsity optimization may comprise a structural change to the model algorithms (320), not shown.

An example of a sparsity optimization that may be employed is the application of a structured sparsity modification to the model using an N: M pattern, whereby N of every M weight elements in the model are set to zero. In this approach, the weights of all convolution layers in the model are examined, the minimum N absolute values of the weights in each group of M are identified, and those weights are overwritten with a value of zero. Training proceeds with continued application of this sparsity optimization, allowing the values of remaining non-zero weights to adapt to the change. Refinements of this approach include a more gradual introduction of sparsity in both degree and model penetration during training. In the case of degree, the selection of N begins at 1 and is slowly increased as training proceeds until the target value of N is reached. In the case of model penetration, sparsity is first introduced to a single convolution layer and gradually expanded to additional layers as training proceeds until all desired layers are sparse. The foregoing sparsity optimizations, individually and in combination, can facilitate a reduction in the training time of the model and preserve model output quality.

The model can also be modified with a quantization optimizer. Quantization optimizations are known to those of skill in the art and can be applied to fit different end-use scenarios, such as for mapping the model outputs to targeted hardware (graphics processing unit (GPU), field-programmable gate array (FPGA), neural processing unit (NPU), central processing unit (CPU)) architectures. Examples of quantization optimizations that may be used include range-based linear quantization, parameterized clipping activation PACT, and wide reduced-precision networks WRPN.

Various super-resolution models are configured to operate with different precisions and to make inferences at different speeds. Modifying a model to run with improved quantization can improve the overall processing speed of the model. However, modifying a model with a quantization optimization prior to training can delay the overall training process. Accordingly, in some of the disclosed embodiments, the model is not modified with any quantization optimization until after training of the model has reached desired convergence thresholds for the different phases of the multi-phase loss function training.

In some embodiments, a multi-phase loss function trained model is modified with quantization optimizations and then additional training is performed by the model to further tune the model with new training data to generate even more proficient results and/or after applying sparsity optimizations to the model.

In some embodiments, a multi-phase loss function trained model is modified with sparsity optimizations and then additional training is performed by the model to further tune the model with new training data to generate even more proficient results prior to and/or after applying quantization optimizations to the model.

Figure 5:
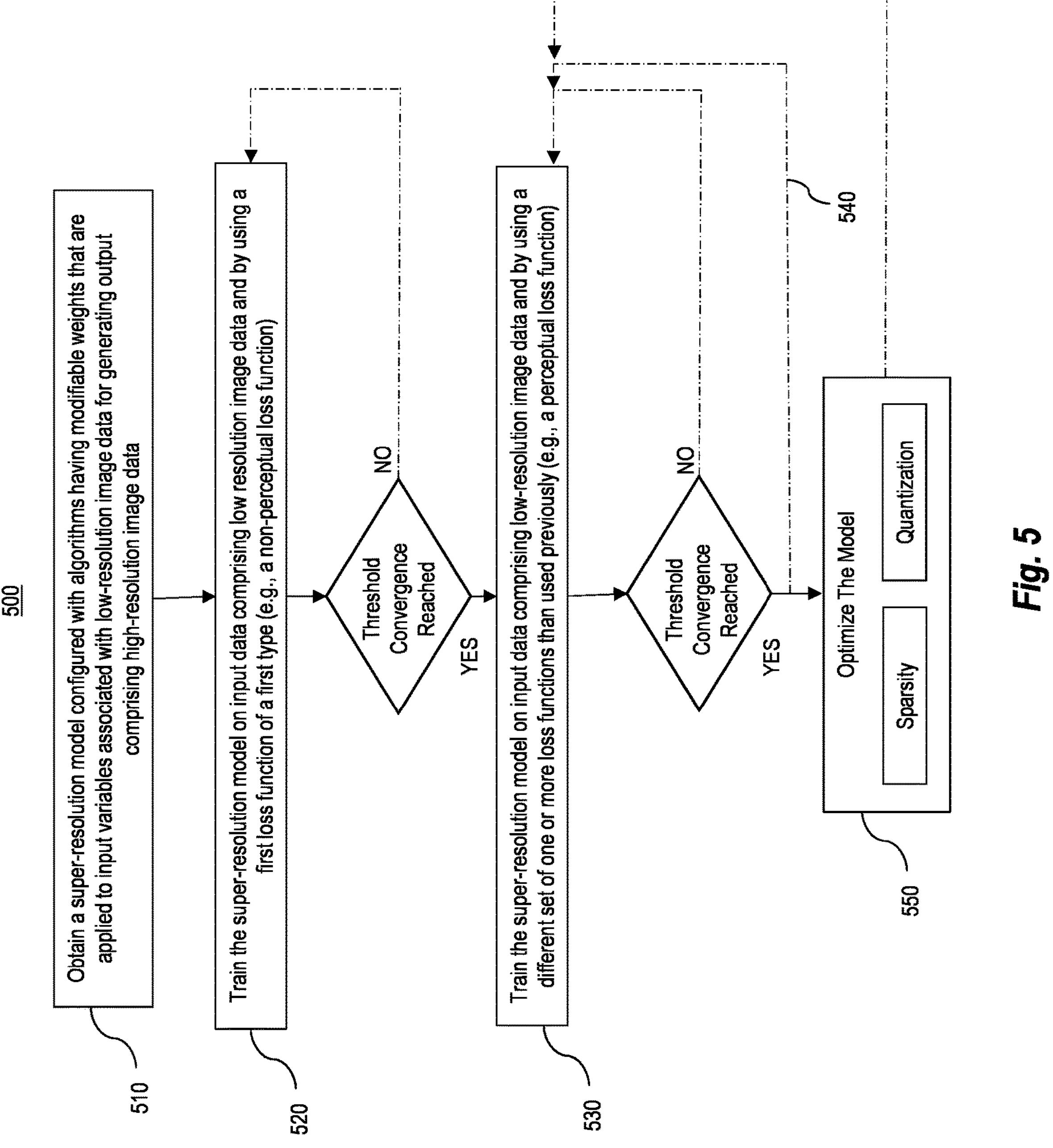
FIG. 5 illustrates an example flow diagram of acts associated with methods for performing multi-phase loss function training and other modifications of super-resolution machine learning models.

Attention is now directed to the flow diagram 500 of FIG. 5. This illustration shows various acts that may be performed when implementing methods for performing multi-phase loss function training and optimizations of super-resolution models. As shown, the first act (510) includes a system obtaining (e.g., accessing or generating) a super-resolution model configured with algorithms having modifiable weights that are applied to input variables associated with low-resolution input data for generating output comprising high-resolution image data. The algorithms can be used to convert from any relatively lower base resolution (e.g., 640×480, 1280×720, 1920×1080, or other resolution that is lower than a relatively higher resolution that is being generated from the image at the base resolution) to any relatively higher resolution (e.g., 1280×720, 1920×1080, 3840×2160 or any other resolution that is relatively higher than the base resolution).

The next act (520) includes training the model on input data comprising low-resolution image data in a first training phase by using a first loss function of a first type (e.g., a non-perceptual loss function, such as SSIM, or any other non-perceptual loss function). The first loss function may also be a blended loss function that includes a plurality of loss functions, as previously described.

The training data includes corresponding pairs of low-resolution image data and target high-resolution images, and may be obtained from a third-party source. Each pair in the training data, for example, comprises a low-resolution image and a corresponding high-resolution version of the low-resolution image.

During training, once a desired threshold of convergence is reached, as described earlier, the system proceeds to the next step or phase of training (act 530). This next phase includes training the model with a different set of one or more loss functions than was previously used (e.g., a perceptual loss function like AGG19 and/or another perceptual loss function). The loss function(s) used in this next training phase may be any combination of one or more loss functions that are either different in composition or proportional use relative to any prior training phases.

Then, once a desired threshold of convergence is reached for this next training phase, the system may perform an additional training phase with a new combination of loss functions, as shown by arrow 540. The system may also stage any number of training phases to be completed, in sequence, each training phase utilizing a unique composition of loss functions that are applied during the training to achieve desired results (e.g. until corresponding and predetermined thresholds of convergence are reached at each training phase).

The system may also perform desired optimizations (act 550), as previously described, subsequent to performing any combination of training phases, which may occur prior to yet some additional training phases to further tune the model after the optimizations.

The optimizations may include sparsity optimizations and quantization optimizations, as well as any other optimizations. Notably, these optimizations are only performed after one or more prior loss function training phases of the model have been completed. It has been found that by staging the multi-phase loss function training in this manner, as well as by delaying the optimizations to the model, it is possible to improve the efficiencies of the training (e.g., enabling the overall training time to be reduced and to reduce computational expenses associated with the training).

After training, and before or after optimizations are made to the model, the model is used to perform super-resolution processing by generating high-resolution image data outputs corresponding to lower resolution image data inputs.

It will be appreciated that the disclosed methods may be practiced by a computer system including a processing system comprising one or more processing units, such as hardware processors, and computer-readable media such as computer memory. In particular, the computer memory may store computer-executable instructions that when executed by one or more processing units cause various functions to be performed, such as the acts recited in the embodiments. The computing system may be a consolidated local system or a distributed system including distributed components in disparate locations, connected by wired and/or wireless connections.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media (e.g., hardware storage devices). Computer-readable media that carry computer-executable instructions are transmission media. Thus, by way of example, embodiments of the invention can comprise at least two distinctly different kinds of computer-readable media: physical computer-readable storage media and transmission computer-readable media.

Physical computer-readable storage media includes random access memory (RAM), read-only memory (ROM), electrically erasable programmable read-only memory (EEPROM), compact disk read-only memory (CD-ROM) or other optical disk storage (such as compact disks (CD)s, digital video disks (DVD)s, etc.), magnetic disk storage or other magnetic storage devices, or any other hardware storage devices which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry desired program code means in the form of computer-executable instructions or data structures and which can be accessed by a general-purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, and the like. The described methods may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing multi-phase loss function training of a super-resolution model, the method comprising:

accessing a super-resolution model configured with algorithms having modifiable weights, the algorithms taking input variables associated with low-resolution image data and generating output comprising high-resolution image data;

training the super-resolution model with a first loss function of a first loss function type in a first training phase;

subsequent to the first training phase, in a second training phase, training the super-resolution model with a second loss function of a second loss function type that is not used during the first training phase; and subsequent to the second training phase, optimizing the super-resolution model by using at least one of a quantization optimization or a sparsity optimization.

2. The method of claim 1, wherein the first loss function type comprises a non-perceptual loss function.

3. The method of claim 2, wherein the first loss function comprises a structural similarity (SSIM) loss function.

4. The method of claim 1, wherein the second loss function type comprises a perceptual loss function.

5. The method of claim 4, wherein the second loss function comprises a Visual Geometry group (VGG) loss function.

6. The method of claim 4, wherein in the second training phase, the method further comprises:

training the super-resolution model with the second loss function in combination with training the super-resolution model with the first loss function.

7. The method of claim 1, wherein optimizing the super-resolution model comprises:

modifying the super-resolution model with a quantization optimization.

8. The method of claim 1, wherein optimizing the super-resolution model comprises:

modifying the super-resolution model with a sparsity optimization.

9. The computing system of claim 1, wherein optimizing the trained super-resolution model comprises using quantization optimization.

10. The computing system of claim 1, wherein optimizing the trained super-resolution model comprises using sparsity optimization.

11. A computing system comprising:

a processing system comprising a processing unit; and storage media having stored computer-executable instructions which are executable for causing the computing system to:

generate a trained super-resolution model by training a super-resolution model having modifiable weights in a plurality of phases that each use different compositions of loss functions, the plurality of phases including:

a first training phase in which the super-resolution model is trained with a non-perceptual loss function until it is determined that a first threshold of convergence has been reached; and a second training phase in which the super-resolution model is trained with a perceptual loss function that is not used in the first training phase, the second training phase being subsequent to the first training phase; and optimizing the trained super-resolution model by using at least one of a quantization optimization or a sparsity optimization.

12. The computing system of claim 11, wherein optimizing the trained super-resolution model comprises using a quantization optimization and a sparsity optimization.

13. The computing system of claim 11, wherein the non-perceptual loss function comprises a SSIM loss function.

14. The computing system of claim 11, wherein the perceptual loss function comprises a VGG loss function.

15. The computing system of claim 11, wherein optimizing the trained super-resolution model comprises using quantization optimization.

16. The computing system of claim 11, wherein optimizing the trained super-resolution model comprises using sparsity optimization.

* * * * *